United States Patent [19]

Traber

[11] 4,071,990

[45] Feb. 7, 1978

[54] DEMOUNTABLE FRAME AND PANEL

[76] Inventor: Fritz Traber, Oberviechtacher Str. 29, 8000 Munich 90, Germany

[21] Appl. No.: 652,595

[22] Filed: Jan. 26, 1976

[30] Foreign Application Priority Data

| | | |
|---|---|---|
| Jan. 29, 1975 | Germany | 2503669 |
| Jan. 29, 1975 | Germany | 2503643 |

[51] Int. Cl.² F16B 7/04

[52] U.S. Cl. 52/155; 403/406; 403/231; 52/656; 52/222; 52/624; 403/292

[58] Field of Search 52/753 D, 753 K, 753 C, 52/758 D, 758 H, 758 R, 753 R, 753 C, 586, 656, 483, 591, 476, 475, 594, 498, 489, 155, 222, 624, 63; 160/391, 3 92, 395; 403/231, 292, 230

[56] References Cited

U.S. PATENT DOCUMENTS

| | | | |
|---|---|---|---|
| 272,302 | 2/1883 | Montgomery | 52/753 K |
| 2,266,464 | 12/1941 | Kraft | 52/753 K |
| 2,363,405 | 11/1944 | Eichelberger | 52/753 K |
| 2,844,848 | 7/1958 | Couse et al | 52/586 X |
| 2,866,235 | 12/1958 | Couse et al. | 52/753 K |
| 3,074,520 | 1/1963 | Grubelich | 52/753 K |
| 3,103,083 | 9/1963 | Seeger | 160/392 X |
| 3,371,702 | 3/1968 | Keegan et al. | 160/392 |
| 3,411,254 | 11/1968 | Kessler | 52/753 K |
| 3,456,413 | 7/1969 | Fischer | 52/591 |
| 3,547,472 | 12/1970 | Ehrman | 52/591 X |
| 3,826,056 | 7/1974 | Smith et al. | 52/753 K |
| 3,835,354 | 9/1974 | Pena | 403/231 X |

FOREIGN PATENT DOCUMENTS

| | | | |
|---|---|---|---|
| 6,505,418 | 10/1965 | Netherlands | 160/395 |
| 1,316,253 | 5/1973 | United Kingdom | 52/238 |

*Primary Examiner*—Wayne L. Shedd
*Attorney, Agent, or Firm*—Allison C. Collard

[57] ABSTRACT

A damage-free mountable and removable arresting device for a foil or a similar thin covering material for making temporary or permanent coverings, encasings, spacial partitions and the like, comprising a plurality of self-supporting longitudinal clamping bars, each formed with at least one groove extending in a direction of a longitudinal axis thereof. An elastic band is pressed into the grooves of the clamping bars and one or more connection clamping elements are inserted into the ends of the grooves for operatively connecting the plurality of clamping bars.

11 Claims, 13 Drawing Figures

FIG.1
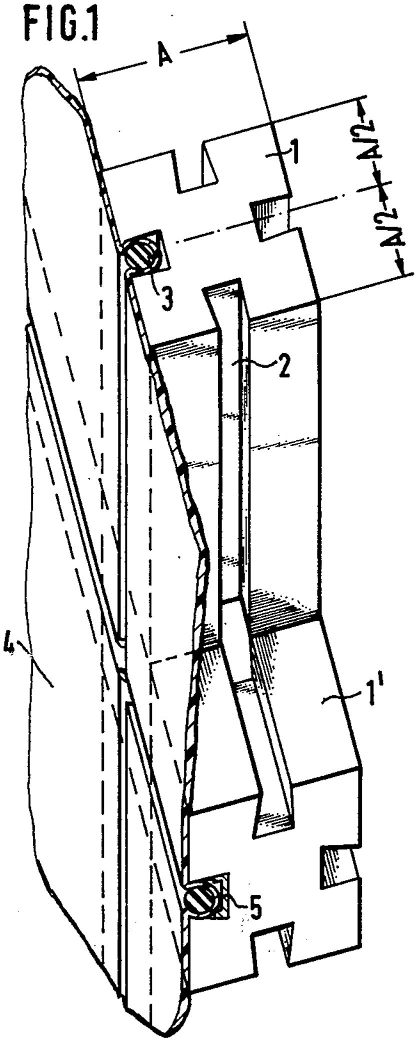
FIG.2a
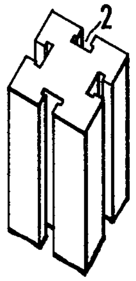
FIG.2b
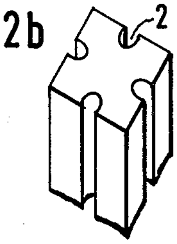
FIG.2c
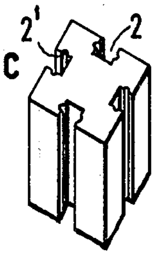
FIG.2d
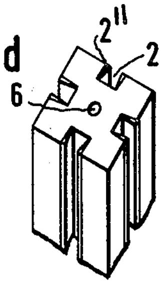
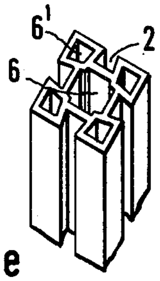
FIG.2e
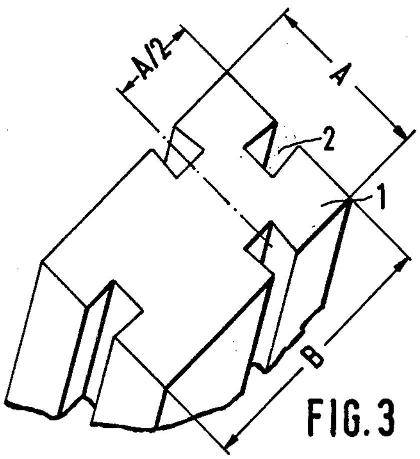
FIG.3

DEMOUNTABLE FRAME AND PANEL

The subject invention relates to a damage free mountable or removable arresting for a foil or a similar thin covering material for making temporary or permanent coverings, encasings, space partitions and the like, essentially consisting of a self-supporting clamping bar with one or a plurality of grooves formed at its surface, a band impressed into the grooves made of an elastic material, and one or a plurality of insertible clamping connection elements which are inserted into the ends of the grooves of the clamping bar for providing a linear or angular fixed, rigid or flexible connection between a plurality of clamping bars, or for stiffening and/or spacially fixing the entire system.

For the production of provisional or permanent coverings, encasings, space partitions and the like, it is known to use covering materials made, for example, of paper, foils or cloth, which are mounted onto frames or simple framework structures and with longitudinal and lateral connections made of frames or boards which are arrested in desired position by nails or screws. This, however, requires a lot of material and is rather time consuming for making fixedly mountable coverings, encasings, spacial partitions, etc. This may still be acceptable despite the fact that a lot of material is needed and a lot of time is required. However, this way of making the covering is completely unacceptable for such structures which are very often required for provisional coverings, encasings or spacial partitions, etc., which are mounted at one place and may be dismantled to be erected at another place. It has been shown that the base material for making these structures as well as the frame or framework structures cannot be used for a different structure or cannot be used at a different place, so that new base material has to be employed. This does not mean that an increased amount of time has to be spent for cutting the new frame or framework parts as well as the new covering material, so that the desired size is obtained, but it also increases the cost of manufacturing. The increased costs are specifically noticeable when provisional structures are made which have to be mounted at different places, dismantled and again mounted at another location.

The prior known covering systems are also disadvantageous in that the construction is relatively complicated, so that it has to be made by experts, requiring a lot of time and material expense. Since the covering material cannot be used again after once being mounted at one place and then being dismantled (e.g., a temporary encasing or material) so as to be placed on another site, however, because the thereby damaged material must be disposed of, there also occurs the problems of waste removal apart from the cost of the materials.

Therefore, attempts have been made for some time to provide covering systems in particular arresting means for foils or similar thin coverings which have the same effect of the previous known systems, but are easily mountable and/or inexpensive with respect to the known systems which use arresting systems.

It is therefore an object of the present invention to provide a simple economical and easily mountable arresting means for foils or similar thin covering material which may be mounted by anyone without requiring special expertise which may be mounted anywhere quickly onto a frame mounting or the like, and can be easily dismantled and placed at another place without damaging the individual parts, so that the same parts can be reused over and over again.

It is another object of the present invention to provide a damage-free mountable and removable arresting means for a foil or similar thin covering material for forming temporary or permanent coverings, encasings, spacial partitions or the like, comprising (a) a self-supporting clamping bar having an arbitrary length with one or a plurality of grooves which extend in the direction of a longitudinal axis, or run spirally, and which are arranged at the same or different, constant or variable spacing from each other, (b) a band of arbitrary length consisting of an elastic material which is pressed into the grooves of the clamping bar, particularly made of soft rubber or soft elastic synthetic material, and (c) one or a plurality of connection clamping elements which are inserted into the ends of the grooves of the clamping bars for making a linearly or angular fixed, rigid or flexible connection between a plurality of clamping bars or for stiffening and/or spacially fixing the entire system.

The present invention provides a self-supporting clamping bar of an arbitrary length in which one or a plurality of grooves are formed which run on its surface in the direction of the longitudinal axis of the bar, or spirally, and which are arranged at the same or different, constant or variable distances from each other, whereby the cross section starting from the upper face widens in an inwardly direction relative to the bar.

In accordance with a preferred embodiment of the present invention, the grooves of the clamping bar have a dove-tailed, T-like or U-like shaped form, and if need be, additional recesses for receiving the detensioned band of elastic material. The cross section of the grooves may also be rectangular, whereby in this case the two side walls of the grooves are provided with a layer of elastic material, preferably made of rubber or a resilient soft plastic material, which is thickened toward the surface of the clamping bar, so as to obtain a reduction of the diameter of the grooves on the surface of the clamping bar.

The cross section of the clamping bar can have any arbitrary shape; preferably it is rectangular, square, triangular, hexagonal and/or oval. The cross section may be solid, or hollow inside. Preferably, the cross section is provided on the inside with one or a plurality of longitudinally hollow spaces which are open or closed at their ends having arbitrary cross sections with variable cross sections, wherein leads, mounting, pulling or control elements may be mounted or which serve to reduce the weight of the clamping bar or to save material. These hollow spaces should be only of such proportions to assure the desired rigidity of the clamping bar. The clamping bar of the invention, the length of which is arbitrary, may be straight in any manner, or it may be in the form of a spiral. It may be made of any material which renders the bar self supporting. The clamping bar preferably is made of wood, compressed wood, metal, like aluminum, magnesium, titanium, an alloy, in particular, a magnesium or aluminum alloy, steel sheet metal, a plastic material, in particular plexi glass, or a paper product, in particular, impregnated paper mache.

In accordance with a preferred embodiment of the invention, the clamping bar has a square cross section with four grooves on the center section of the sides, the cross section of which is preferably dove tailed, U-shaped or T-shaped (if need be, with an additional recess for receiving the detensioned band after the same is pressed into the groove). In general, the clamping bar of the invention is smaller at the surface of the bar with respect to the inside of the same, whereby the shape of the expansion of the cross section is not critical. Concerning a U-shaped configuration of the groove, it is to be understood that the U-shaped cross section is reduced at its surface side. When both sides of the clamping bar are covered and mounted in order to vary the distance between the clamping bar, the bar can have a rectangular cross section, whereby the covering material can lie on the two short sides of the rectangularly-shaped element (the longer distance between the covering foils), or on the two longer sides (the shorter distance between the two covering foils). Thereby, it is possible to use the hollow space between the covering foils and the existing air column to obtain a variable heat/cold insulation.

The usable band in the invention is made of a resilient soft material, in particular, of a soft rubber or a soft elastic plastic material which may be an endless band or a band having a limited length. The degree of elasticity may be variable. However, it should be insured that the band has an arbitrary cross section, and preferably such that it can be pressed into the grooves on the clamping bar. After being pressed into the grooves of the clamping bar, the band relaxes within the grooves, because the grooves widen at their inside, so that a rigid placement of the band is assured within the grooves. This arresting within the grooves can be improved with recesses in the side walls of the grooves which provide an even better positioning of the relaxed band. Generally, the seating of the band within the groove must be such that the fastening of the arrested upper surface is increased by the pulling force of the band. The effectiveness of the arresting may be adjusted by modifying the degree of elasticity of the arresting band or by increasing the width and/or form of the groove at the surface level of the clamping device. This can be achieved with the arresting band being of a deformed rubber or plastic hose which is impressed into the groove of the clamping bar, whereby its hollow inside is subjected to a gas pressure. When dismantling the arresting band, the hollow inside space of the rubber or plastic hose is preferably deflated.

For dismantling of the temporary spacial partition, the provisional encasing, covering or the like, the arresting band may be removed from the groove either manually or by using a suitable tool by removing the band upwardly or retracting the band longitudinally from the groove.

A further embodiment of the invention is a new connection element comprising a longitudinal strip of material which essentially consists of a rigid or flexible material, the longitudinal sides thereof tapering towards their upper ends so that an easier insertion into the groove of the clamping bar can be achieved. On the other hand, the required detensioned band, which requires a certain space, is not thereby impaired. The deformation of the side edges of the strip may be such that the cross section of the connection clamping element is rectangular or square, or tapers upwardly (preferably dove-tail like or U-shaped).

A further embodiment of the connecting clamping element may be made of a rigid, or flexible material. Preferably, it consists of a metal, in particular, a light metal, like magnesium, aluminum or titanium, a metal alloy, in particular, made of steel or a magnesium or aluminum alloy, or a rigid or flexible plastic material which is deformable by means of casting, injection molding and the like, in particular, using polyvinylchloride or plexi glass.

If the connection clamping element has only a stiffening function, the edges do not have to be bent open and may be inserted into the groove of the clamping bar, as is. For making angular connections, the clamping connection element consists of a preferably shaped square, rectangular, hexagonal, round or oval base plate, from which two or a plurality of relatively small strips of arbitrary lengths extend, the side edges of which, as above mentioned, are bent so that they do not hinder the arresting band which is inserted in the groove.

The base plate is preferably even and solid. However, it can be perforated and can have bores of a desired cross section and any number, through which their leads, cords, controlling or anchoring elements are guided, or which may be used as a plug in- or screw-connection. It consists preferably of the same materials as the small strips with the bent lateral edges, which are made of, and preferably form, one integral element. However, the small strips may be mounted onto the base plate.

The base plate preferably comprises one or a plurality of punched or plugged in or, stamped in and bent open triangles, which are still connected with the base plate at one side for mounting an anchoring element, in particular, a cord or the like.

The strips which extend from the base plate are so deformable such that they form an angle with respect to the base plate, which preferably is a 90° angle. However, these small strips may be removed from the base plate by repeatedly bending the same back and forth, or by means of a suitable tool, if the presence of these strips are unnecessary. The small strips which extend from the base plate may be formed with suitable openings which may comprise one or more openings, by means of which a fixed connection can be made with a bore in another clamping bar and the already plugged in clamping connection piece (fixed connection, for example, comprising screws, bolts, or splints).

In accordance with one embodiment of the invention, the connection clamping means essentially consists of a square plate and four small strips which extend from the center of the four sides of the square base plate having dove-tailed bent open side edges. The base plate may be provided with cutouts on at least two oppositely arranged sides, the width of which corresponds to the width of the thereon adjoining strips minus the bent sides edges thereof, and their depth corresponds to the depth of the groove within the clamping bar.

In accordance with another embodiment of the connection clamping means of the invention, triangular surfaces, which are connected along a common edge forming an integral unit with a square base plate, connect on two opposite sides of the square base plate which triangular surfaces can be bent into a pyramid (compare FIGS. 7*a* and 7*b*). By means of such a pyramid, the arresting system may be fastened on a supporting face (for example, it may be plugged into the ground). This pyramid and the attached strips may be made of plastic material.

A further embodiment of the arresting means for foils, thin covering material, for example, made of paper, cloth and the like, is easy to handle and does not require any special skill. It is therefore possible to erect a framework without special tools, or other means, which can be covered with a foil or a similar thin covering material and which can be easily dismantled and can be covered with another foil or the like. When dismantling, only the clamping of the groove has to be removed, whereby the angular or straight aligned inserted connection clamping pieces are released. All parts remain undisturbed and can be reused at will. Because no parts have to be disposed, there is no problem of waste disposal.

The inventive arresting system, as well as the individual parts therefor, may be used in the trade, in the household, in the garden, by home workers, in the yards, in stadiums, for hobby shops and for making toys. In this manner without any problems, sun shields, sight shields, separating walls, emergency windows, covers for plants, swimming pool covers, changing cabins, protective covers against rain incoming sun rays or cold rays, nurseries, film screens, winter construction halls and the like may be made. Also, decorative wall coverings for demonstration or commercial purposes may be used, as well as for separators in fair grounds defining the exposition space and as space saving printed coulisse for travelling theaters and the like. Furthermore, the invention may be used for completion of travelling landscapes for the exhibition of fairy tale scenes.

The arresting means is particularly suitable for making covers for outdoor swimming pools, whereby due to a two-sided covering of the clamping frame, with an upper dark foil, not only the undesirable heat evaporation of a heated swimming pool is prevented but an energy-saving heating of the water is obtained by means of the reflecting sun beams. Thereby, portable halls which are insulated against cold may be used for winter construction without any expensive commercial or technical expense, which after completion of the construction site, may be easily removed and may be readily installed at any other given site.

The arresting system may also be used for the making of solar energy collectors for the storing of solar energy. The hitherto known solar energy collectors comprise a plurality of superimposed collectors made of metal, wood and plastic frames with inlaid glass plates, plates made of an insulating material (Styropor or glass wool), aluminum foil and plates which are blackened with soot. In these known collectors, the frames may be put together with the clamping bars of the invention and the connection clamping elements, which are provided with clear or dark (blackened) foil. In this way, very economical solar energy collecting devices may be made having a low weight, which are as effective as the known sun collecting energy devices, yet easier to maintain, because the used foils can be more easily exchanged. The low weight is particularly of importance, because they can be easily mounted on top of a roof of a house. The arresting system of the invention is particularly suitable not only for producing partition elements for remodeling (for example, in exhibition halls, and in the market and in living quarters), but is also suitable for simple and reversible covering of linen on beds.

Other objects and features of the present invention will become apparent from the following detailed description taken in connection with the accompanying drawings which disclose several embodiments of the invention. It is to be understood, however, that the drawings are designed for the purposes of illustration only, and are not intended as a definition of the limits and scope of the invention disclosed.

In the drawings, wherein similar reference characters denote similar elements throughout the several views:

FIG. 1 is a perspective view of a damage-free mountable and removable arresting system for a foil or a similar thin covering material in an "overlap connection" in accordance with the invention;

FIGS. 2*a* to 2*e* are perspective views of various embodiments of the clamping bar of the invention, partly broken away;

FIG. 3 is a perspective view of a special embodiment of the clamping device for a two-sided covering with a foil;

FIGS. 4*a* and 4*b* are a perspective and top plan view, respectively, two preferred embodiments of the connection clamping element of the invention for making linear or angular connections between the different clamping elements;

FIG. 6 is a perspective schematic view of a straight lined connection between two clamping bars by using the clamping element of FIG. 4*a.

Figure 5:
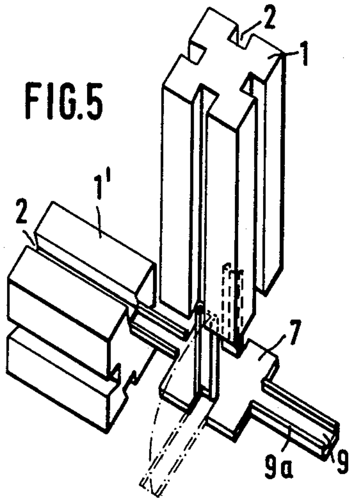
FIG. 5 is a perspective schematic view of the "overlapping connection38 by using the connection piece shown in FIG. 4*b;*

Referring now to FIG. 1, there is shown one embodiment of the invention of a damage-free mountable and removable arrest for a foil or a similar thin covering material comprising two clamping bars 1 and 1' having a square cross section (of edge lengths A). A longitudinal groove 2 with dove tail cross section, is always formed in the center of each of the four edges, and a rounded deformable band 3 which is wrapped with a foil 4 is pressed into the groove. The two clamping bars 1 and 1' form a rectangular connection and are fixedly connected with each other by means of a connection clamping element, whereby only one inserted end 5 is shown in cross section.

FIGS. 2*a* to 2*e* show a preferred embodiment of the clamping bar of the invention having a square cross section which is solid; having four centrally located grooves 2 with a T-shaped cross section (FIG. 2*a*) which is solid within; and with four centrally provided grooves 2 with U-shaped cross sections (FIG. 2*b*); and the grooves having a dove-tailed cross section in the oblique side walls which are formed with an additional recess 2' (FIG. 2*c*). The clamping bar 1 is provided with an opening 6 passing therethrough in the axial direction with open ends, as well as centrally provided grooves 2 having rectangular or square cross sections of which the side walls of the grooves 2 are provided with layers 2'' which are made of an elastic material becoming thicker toward the upper surface of the clamping bar 1 (FIG. 2*d*), or with axially extending hollow spaces 6 and 6', having open ends, as well as four centrally arranged grooves 2 with dove-tailed cross sections (see FIG. 2*e*).

FIG. 3 shows the self-supporting clamping device 1 of the invention having a rectangular cross section with the edge lengths A and B, and grooves 2 with dove-tail like cross sections, whereby the device can be covered on both sides with a foil in such a way that the foil upper faces have the distance B and/or A from each other.

Figure 4B:
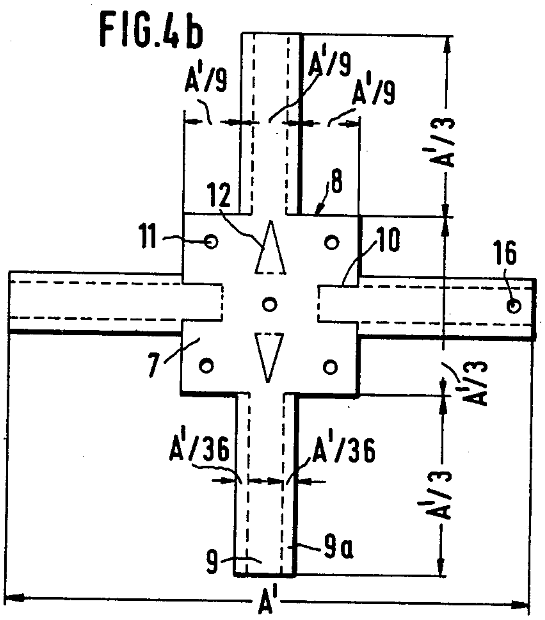
Figure 4A:
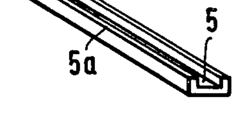

FIG. 4*a* shows the connection clamping element 5 with bent open sides 5*a*, which come close to each other at their upward position (forming a dove-tailed cross section for the connection clamping element). It can have one or a plurality of openings 16 (FIG. 4*b*) which facilitate the connection of the connection clamping piece to the clamping bar by means of corresponding bores which may be engaged by screws, bolts or splints so as to arrest the foil. The screws or bolts may be adjusted when increased pulling forces are required.

FIG. 4*b* shows another preferred embodiment of the connection clamping element 8, comprising a square base plate 7 having with the edge lengths A' from the four centrally arranged strips 9 having dove-tailed bent edges 9*a* which have the same function as the connection clamping piece as shown in FIG. 4*a*. By bending the strips 9 open, it is possible to have an angular connection between the different clamping bars of the invention. The openings 16 which are provided if need be in the strips 9, make possible the production of a still more rigid connection (under circumstances by the insertion of screws, bolts or splints in corresponding bores of the clamping bar) between the clamping bar and the connection clamping piece which is inserted in its groove.

Two strips 9 which are opposite each other are cut over their entire width minus the bent edges 9*a* in the square base plate 7, up to a depth which corresponds to the depth of the groove 2 in the connection clamping bar 1 according to FIG. 1. The base plate 7 may be provided with bores 11 as well as mounted and/or stamped on and bent triangles 12 which are still connected on one side with the base plate 7. These triangular pieces 12 serve for the securing of the anchoring means, for example, anchoring cords and the like. The dimensions of the preferred embodiment of the connection clamping piece of FIG. 4*b* are shown therein.

FIG. 5 shows a practical embodiment of making an angular (in this case a rectangular) connection between two clamping bars 1 and 1', whereby the strips 9 which extend from the base plate 7, (which strips have the dove-tailed bent edges 9*a*), are inserted into the grooves 2 of clamping bars 1 and 1'.

Figure 6:
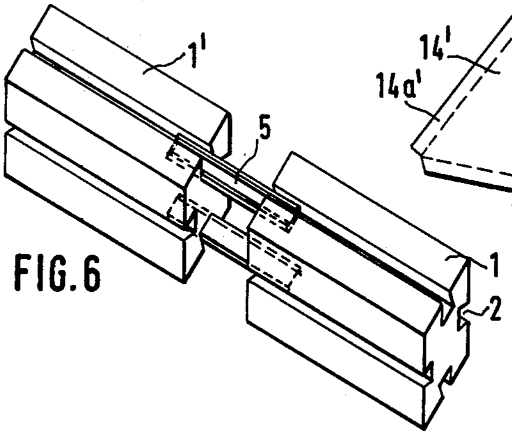

FIG. 6 shows a linear connection between the clamping bars 1 and 1' by using two connection clamping pieces 5 according to FIG. 4*a* with bent edges 5*a*.

Figure 7B:
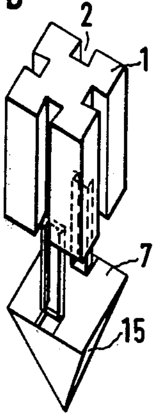
* and FIGS. 7*a* and 7*b* are top plan schematic views of a connection clamping piece for making a bottom anchoring in the form of a winding off (FIG. 7*a*), as well as in a form ready for use (FIG. 7*b*).
Figure 7A:
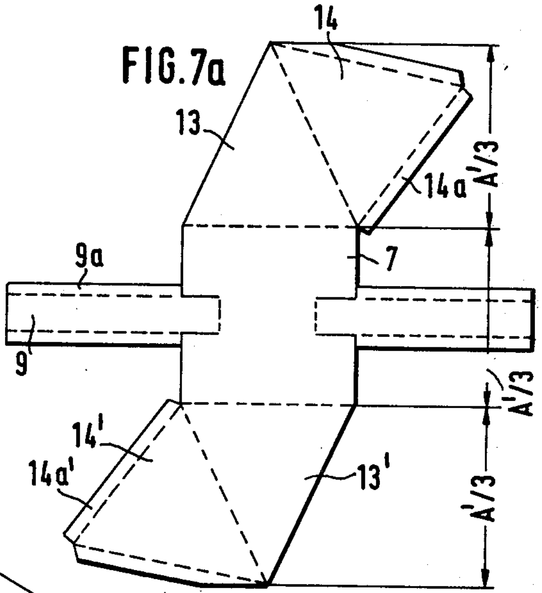

FIG. 7*a* shows a different embodiment from that shown in FIG. 4*b*, in which on the two opposite not cutout sides of the square base plate 7, respectively, there are two triangles 13, 14 or 13', 14', respectively, which triangles are connected by a common edge, whereby the triangles 13, or 13' are connected by one of its otherwise free sides with the base plate 7. Further, the triangles 14 and 14' are formed with bent edges 14*a* and 14*a'*. The triangles 13, 14 or 13', 14' all have equal legs and are congruent with respect to each other. Therefore, when bending these triangles, a pyramid according to FIG. 7*b* is formed, the square base face of which defines the base plate 7. The two strips 9 which extend from this base plate 7 and which are provided with the bent edges 9*a*, may be bent away from the base plate 7 as shown in FIG. 7*b*, to such extent that these edges form a right angle with the base plate 7. These two strips 9 may then be inserted into two oppositely located grooves 2 of a clamping bar 1 (as shown in FIG. 7*b*). The base plate 7 may be of any shape, e.g., square, rectangular, hexagonal, round or oval.

FIG. 7*b* shows the embodiment of FIG. 7*a* of the clamping connection piece of the invention in ready to use shape with a rigidified pyramid which may be used as a ground anchoring means or spike.

While several embodiments of the present invention have been shown and described, it will be obvious to those skilled in the art that many changes and variations may be made thereunto without departing from the spirit and scope of the invention.

What is claimed is:

1. A device for providing erectable and demountable, wall-like structures, using a mountable and removable arresting device for a foil or a similar thin covering material for making temporary or permanent coverings, encasings, spatial partitions, and the like, comprising:

a plurality of self-supporting, elongated, longitudinally-extending clamping bars, each having a generally rectangular cross-section and having defined therein at least one, open-ended groove, extending in a direction of a longitudinal axis thereof and having ends, said grooves have a generally dovetailed cross-section which widens in the direction toward the interior of said clamping bar;

a foil of thin covering material;

an arresting device including an elastic band over which an end of said foil may be wrapped and which is pressed into said at least one groove of said clamping bars for connecting said foil with said clamping bars, said elastic band being pressed into said groove in a transverse direction to its longitudinal axis, but parallel thereto for holding said foil in tight engagement with said clamping bars; and at least one connection clamping element, including a generally rectangular base plate and at least two self-retaining, elongated strips having bent, lateral edges extending from and connected to said base plate, which are inserted into the ends of said at least one groove for frictional engagement therewith and for connecting said plurality of clamping bars sesurely together, said strips being receivable within said groove generally below said band also received in said groove.

2. The device according to claim 1 further comprising walls defining said at least one groove and being formed with additional recesses thereon.

3. The device according to claim 1, further comprising two side walls defining said at least one groove as constituting a rectangular cross-section; and a layer disposed on said two side walls, said layer being made of an elastic material, thickening in a direction away from said clamping bar, to define said dove-tailed cross-section of said grooves.

4. The device according to claim 1 wherein at least one of said clamping bars has extending along the longitudinal axis thereof at least one hollow space.

5. The device according to claim 1 wherein said base plate is formed with at least one triangular piece connected at one side with said base plate and including means for mounting an anchoring member thereto.

6. The device according to claim 1 wherein said base plate includes two-integrally-formed pairs of triangles each formed at two opposite portions of said base plate, each of said pairs of triangles include two connected triangles forming an integral unit, said triangles being adapted to be bent into a pyramid.

7. The device according to claim 1 wherein said base plate is a square-shaped member and said strips include four strips, each said strips extending from a center of said base plate and being provided with said bent lateral edges.

8. The device according to claim 7, wherein said base plate has two opposite sides having notched edges and wherein at least two of said elongated strips, extending generally perpendicularly to the plane of said base, are disposed opposite one another and are each integrally connected to one of said notched edges of said base plate, with the depth of said bent, lateral edges thereof, corresponding to the depth of said grooves of said clamping bars.

9. A device for providing erectable and demountable, wall-like structures, using a mountable and removable arresting device for a foil or similar thin covering material for making temporary or permanent coverings, encasings, spatial partitions, and the like, comprising;

a plurality of self-supporting, elongated, longitudinally-extending clamping bars, each formed with at least one groove extending in a direction of a longitudinal axis thereof and having ends;

a foil of thin covering material;

an arresting device, including an elastic band adapted to be wrapped with an end of said foil and pressed into at least one groove of said clamping bars for connecting said foil with said clamping bars, said elastic band being pressed into said groove in a transverse direction to its longitudinal axis but parallel thereto for holding said foil in tight engagement with said clamping bars; and at least one connection clamping element including a base plate having two opposite sides, each having a notched edge, at least two self-retaining elongated strips disposed opposite one another and integrally connected to one of said notched edges of said base plate, which are inserted into the ends of said at least one groove for frictional engagement therewith and for connecting said plurality of clamping bars securely together, said strips being receivable within said groove, generally below said band also received in said groove, said strips having portions forming bent, lateral edges, the depth of which correspond to the depth of said grooves in said clamping bars, and at least one triangular piece connected at one said with said base plate and including means for mounting an anchoring member thereto.

10. A device for providing erectable a and demountable, wall-like structures, using a mountable and removable arresting device for a foil or similar thin covering material for making temporary or permanent coverings, encasings, spatial partitions, and the like, comprising:

a plurality of self-supporting, elongated, longitudinally-extending clamping bars, each formed with at least one groove extending in a direction of a longitudinal axis thereof and having ends;

a foil of thin covering material;

an arresting device, including an elastic band adapted to be wrapped with an end of said foil and pressed into said at least one groove of said clamping bars for connecting said foil with said clamping bars, said elastic band being pressed into said groove in a transverse direction to its longitudinal axis but parallel thereto for holding said foil in tight engagement with said clamping bars; and at least one connection clamping element including a square-shaped base plate having two opposite sides, each having a notched edge, two elongated strips disposed opposite one another and integrally-connected to one of said notched edges of said base plate and extending generally upwardly therefrom, two elongated strips disposed opposite one another, each integrally-connected to one of the other opposite sides of said base plate and extending outwardly from the center of said base plate, said strips having portions forming bent, lateral edges, the depth of which correspond to the depth of said grooves in said clamping bars, and being inserted into the ends of said at least one groove for frictional engagement therewith and for connecting said plurality of clamping bars securely together, said strips being receivable within said groove, generally below said band also received in said groove.

11. A device for providing erectable and demountable wall-like structures, using a mountable and removable arresting device for a foil or similar thin covering material for making temporary or permanent coverings, encasings, spatial partitions, and the like, comprising:

a plurality of self-supporting, elongated, longitudinally-extending clamping bars, each formed with at least one groove extending in a direction of a longitudinal axis thereof and having ends;

a foil of thin covering material;

an arresting device, including an elastic band adapted to be wrapped with an end of said foil and pressed into said groove in a transverse direction to its longitudinal axis but parallel thereto, for holding said foil in tight engagement with said clamping bars; and at least one connection clamping element including a square-shaped base plate having two opposite sides, each having a notched edge, two elongated, self-retaining strips disposed opposite one another and integrally-connected to one of said notched edges of said base plate and extending generally upwardly therefrom, which are inserted into the ends of said at least one groove for frictional engagement therewith and for connecting said plurality of clamping bars securely together said strips being receivable within said groove generally below said band also received in said groove, said strips having portions forming bent, lateral edges, the depth of which correspond to the depth of said grooves in said clamping bars, and pairs of triangles integrally-connected to said base plate at opposite portions thereof, each of said pairs of triangles including two, connected triangles forming an integral unit, said triangles being adapted to be bent into a pyramid.

* * * * *